United States Patent
Choi et al.

(10) Patent No.: US 8,958,756 B2
(45) Date of Patent: *Feb. 17, 2015

(54) COGNITIVE RADIO COMMUNICATION SYSTEM RECOGNIZING INTERFERENCE BASED ON KNOWN SIGNAL

(71) Applicants: Samsung Electronics Co., Ltd., Suwon-si (KR); Korea Advanced Institute of Science and Technology, Daejeon (KR)

(72) Inventors: Hyun Ho Choi, Suwon-si (KR); Yong Ho Cho, Cheonan-si (KR); Jung Hyun Park, Busan (KR); Dong Jo Park, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,347

(22) Filed: May 10, 2013

(65) Prior Publication Data

US 2013/0243133 A1     Sep. 19, 2013

Related U.S. Application Data

(63) Continuation of application No. 12/349,303, filed on Jan. 6, 2009, now Pat. No. 8,515,357.

(30) Foreign Application Priority Data

Jun. 2, 2008   (KR) .................. 10-2008-0051701

(51) Int. Cl.
*H04B 15/00*    (2006.01)
*H04B 17/00*    (2006.01)
(Continued)

(52) U.S. Cl.
CPC ........... *H04L 27/2649* (2013.01); *H04W 72/02* (2013.01)

USPC .................. 455/67.13; 455/67.11; 455/63.1; 455/62

(58) Field of Classification Search
CPC .. H04W 16/14; H04W 24/00; H04L 27/0006; H04B 17/0042; H04B 17/0057
USPC .............................................. 455/63.1, 67.11
See application file for complete search history.

(56) References Cited

U.S. PATENT DOCUMENTS

| 4,145,656 A | 3/1979 | Merryman et al. |
| 5,511,010 A | 4/1996 | Burns |

(Continued)

FOREIGN PATENT DOCUMENTS

| JP | 2007-053546 | 3/2007 |
| JP | 2007-088940 | 4/2007 |

(Continued)

OTHER PUBLICATIONS

Cabric, D. et al. "Implementation Issues in Spectrum Sensing for Cognitive Radios." *Proceedings in IEEE Signals, Systems and Computers, 2004.* Conference Record of the Thirty-Eighth Asilomar Conference on Pacific Grove, CA, USA. Nov. 7-10, 2004: vol. 1: pp. 772-776; 5 pages.

(Continued)

*Primary Examiner* — Gennadiy Tsvey
(74) *Attorney, Agent, or Firm* — NSIP Law

(57) ABSTRACT

A cognitive radio (CR) communication apparatus and method is provided. A cognitive radio (CR) communication apparatus includes a signal receiving unit which receives signals from a primary user of a primary system and a secondary transmitter of a secondary system, the received signals including an element associated with at least one known signal of the secondary transmitter, and a determination unit which determines whether a signal of the primary user exists from among the received signals based on the element associated with the at least one known signal.

12 Claims, 6 Drawing Sheets

(51) Int. Cl.
*H04L 27/26* (2006.01)
*H04W 72/02* (2009.01)

(56) References Cited

U.S. PATENT DOCUMENTS

| | | | |
|---|---|---|---|
| 6,067,292 | A | 5/2000 | Huang et al. |
| 7,424,268 | B2 | 9/2008 | Diener et al. |
| 2005/0245199 | A1 | 11/2005 | Batra et al. |
| 2006/0171445 | A1 | 8/2006 | Batra et al. |
| 2007/0032254 | A1 | 2/2007 | Chen |
| 2007/0086396 | A1 | 4/2007 | Alapuranen |
| 2007/0100922 | A1 | 5/2007 | Ashish |
| 2007/0117517 | A1 | 5/2007 | Junhong et al. |
| 2007/0226576 | A1 | 9/2007 | Ji et al. |
| 2008/0086286 | A1 | 4/2008 | Shellhammer |
| 2008/0166974 | A1 | 7/2008 | Teo et al. |
| 2010/0111235 | A1 | 5/2010 | Zeng et al. |

FOREIGN PATENT DOCUMENTS

| | | |
|---|---|---|
| JP | 2008-206044 A | 9/2008 |
| JP | 2009-206780 A | 9/2009 |
| JP | 2009-272830 A | 11/2009 |
| KR | 10-2007-0048530 | 5/2007 |
| KR | 10-2007-0048553 | 5/2007 |
| KR | 10-2007-0098284 | 10/2007 |
| WO | WO 2006/092830 A1 | 9/2006 |
| WO | WO 2007/007390 A1 | 1/2007 |
| WO | WO 2007/049547 A1 | 5/2007 |
| WO | WO-2008/043936 A2 | 4/2008 |

OTHER PUBLICATIONS

International Search Report mailed Dec. 17, 2012, issued in counterpart International Patent Application No. PCT/KR2009/002120; 3 pages in English.

COGNITIVE RADIO COMMUNICATION SYSTEM RECOGNIZING INTERFERENCE BASED ON KNOWN SIGNAL

CROSS-REFERENCE TO RELATED APPLICATION

This application is a continuation of U.S. patent application Ser. No. 12/349,303, filed on Jan. 6, 2009, which claims the benefit under 35 U.S.C. §119(a) of a Korean Patent Application No. 10-2008-0051701, filed on Jun. 2, 2008 in the Korean Intellectual Property Office, the entire disclosures of which is incorporated herein by reference.

TECHNICAL FIELD

The following description relates to a communication system, and more particularly, to a technology enabling a cognitive radio (CR) communication apparatus of a secondary system to sense a signal of a primary system.

BACKGROUND

Researches have been conducted to efficiently use limited frequency resources, and attentions have been focused on a cognitive radio (CR) technology.

Generally, a CR technology reuses limited frequency resources to more efficiently use the frequency resources. In a CR technology, a secondary communication apparatus of a secondary system may periodically or aperiodically sense radio resources that are not used in a primary system, to recognize an available frequency resource and receive/transmit data using the recognized available frequency resource.

However, a primary system typically has priority with respect to an available frequency resource. Accordingly, where a signal of the secondary system may collide with a signal of the primary system, it may be necessary for a secondary communication apparatus to stop communication operations or change frequency resources that are being used.

Thus, the secondary communication apparatus may be required to appropriately sense whether a signal of a primary system exists. For example, the secondary communication apparatus may periodically stop communication operations in the secondary system and sense whether a signal of a primary system exists. In this case, however, stopping communication operations to sense a signal of a primary system may waste radio resources such as time resources.

Accordingly, there is a need for a technology enabling a secondary communication apparatus to appropriately sense a signal of a primary system without wasting radio resources. Since a number of communication systems use a multiple input multiple output orthogonal frequency division multiplexing (MIMO OFDM), there is also a need for a technology enabling a secondary communication apparatus to more efficiently sense a signal of a primary system in a communication environment using MIMO OFDM.

SUMMARY

According to one general aspect, there is provided a cognitive radio (CR) communication apparatus and method which senses a signal of a primary user using an element associated with at least one known signal received from a secondary transmitter. Accordingly, the signal of the primary user may be sensed without a separate sensing time period for sensing the signal.

According to another aspect, there is provided a CR communication apparatus and method which senses a signal of a primary user based on a correlation matrix. Accordingly, the signal of the primary user may be sensed more precisely and efficiently.

According to still another aspect, there is provided a CR communication apparatus and method which controls a size of a correlation matrix, and senses a signal of a primary user based on a form of the correlation matrix. Accordingly, the signal of the primary user may be sensed with fewer computations.

According to yet another aspect, there is provided a CR communication apparatus and method which uses a correlation matrix to sense a signal of a primary user. Accordingly, a false alarm probability and missed detection probability may be reduced.

According to yet another aspect, there is provided a cognitive radio (CR) communication method, including receiving signals from a primary user of a primary system and a secondary transmitter of a secondary system through a plurality of antennas, the received signals including an element associated with at least one known signal of the secondary transmitter, determining whether a signal of the primary user exists from among the received signals using a correlation matrix generated based on the received signals and the element associated with the at least one known signal of the secondary transmitter, and recognizing an available radio resource using a CR technology depending on whether the signal of the primary user exists.

The correlation matrix may be associated with whether the signal of the primary user exists.

The determining may comprise determining whether the signal of the primary user exists based on a correlation matrix generated based on a remaining element, and the remaining element may be generated based on a difference between the received signals and the element associated with the at least one known signal.

The determining may comprise determining whether the signal of the primary user exists based on off-diagonal elements of the generated correlation matrix.

The determining may comprise determining whether the signal of the primary user exists based on a plurality of correlation matrices generated based on a difference between the received signals and elements associated with a plurality of known signals of the secondary transmitter, and the plurality of known signals may correspond to the plurality of correlation matrices and a plurality of sub-carriers.

The determining may comprise determining whether the signal of the primary user exists based on a sum of the plurality of correlation matrices.

According to yet another aspect, there is provided a CR communication apparatus, including a signal receiving unit which receives signals from a primary user of a primary system and a secondary transmitter of a secondary system, the received signals including an element associated with at least one known signal of the secondary transmitter, and a determination unit which determines whether a signal of the primary user exists from among the received signals based on the element associated with the at least one known signal.

The determination unit may determine whether the signal of the primary user exists using a correlation matrix generated based on the received signals and the element associated with the at least one known signal, and the correlation matrix may be associated with whether the signal of the primary user exists.

The determination unit may determine whether the signal of the primary user exists based on a correlation matrix generated based on a remaining element, and the remaining element may be generated based on a difference between the received signals and the element associated with the at least one known signal.

The determination unit may determine whether the signal of the primary user exists based on off-diagonal elements of the generated correlation matrix.

The determination unit may determine whether the signal of the primary user exists based on a similarity between a form of the generated correlation matrix and a form of a diagonal matrix.

The signal receiving unit may receive the signals from the primary user and secondary transmitter regardless of whether the secondary transmitter transmits a signal, and the determination unit may determine whether the signal of the primary user exists regardless of whether the secondary transmitter transmits the signal.

The determination unit may determine whether the signal of the primary user exists based on a plurality of correlation matrices generated based on a difference between the received signals and elements associated with a plurality of known signals of the secondary transmitter, and the plurality of known signals may correspond to the plurality of correlation matrices and a plurality of sub-carriers.

The determination unit may determine whether the signal of the primary user exists based on a sum of the plurality of correlation matrices.

The number of generated correlation matrices may be adjustable.

The determination unit may generate a correlation matrix in each of a plurality of time periods and determine whether the signal of the primary user exists based on the correlation matrix generated in each of the plurality of time periods, and a number of the plurality of time periods may be previously determined.

The signal receiving unit may receive the signals through a plurality of antennas, and a size of the generated correlation matrix may be determined based on a number of antennas.

The CR communication apparatus may further comprise a radio resource recognition unit which recognizes an available radio resource using a CR technology depending on whether the signal of the primary user exists.

The radio resource recognition unit may recognize that a radio resource assigned for the primary system is unavailable where the signal of the primary user exists, and recognize that the radio resource assigned for the primary system is available where the signal of the primary user does not exist.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
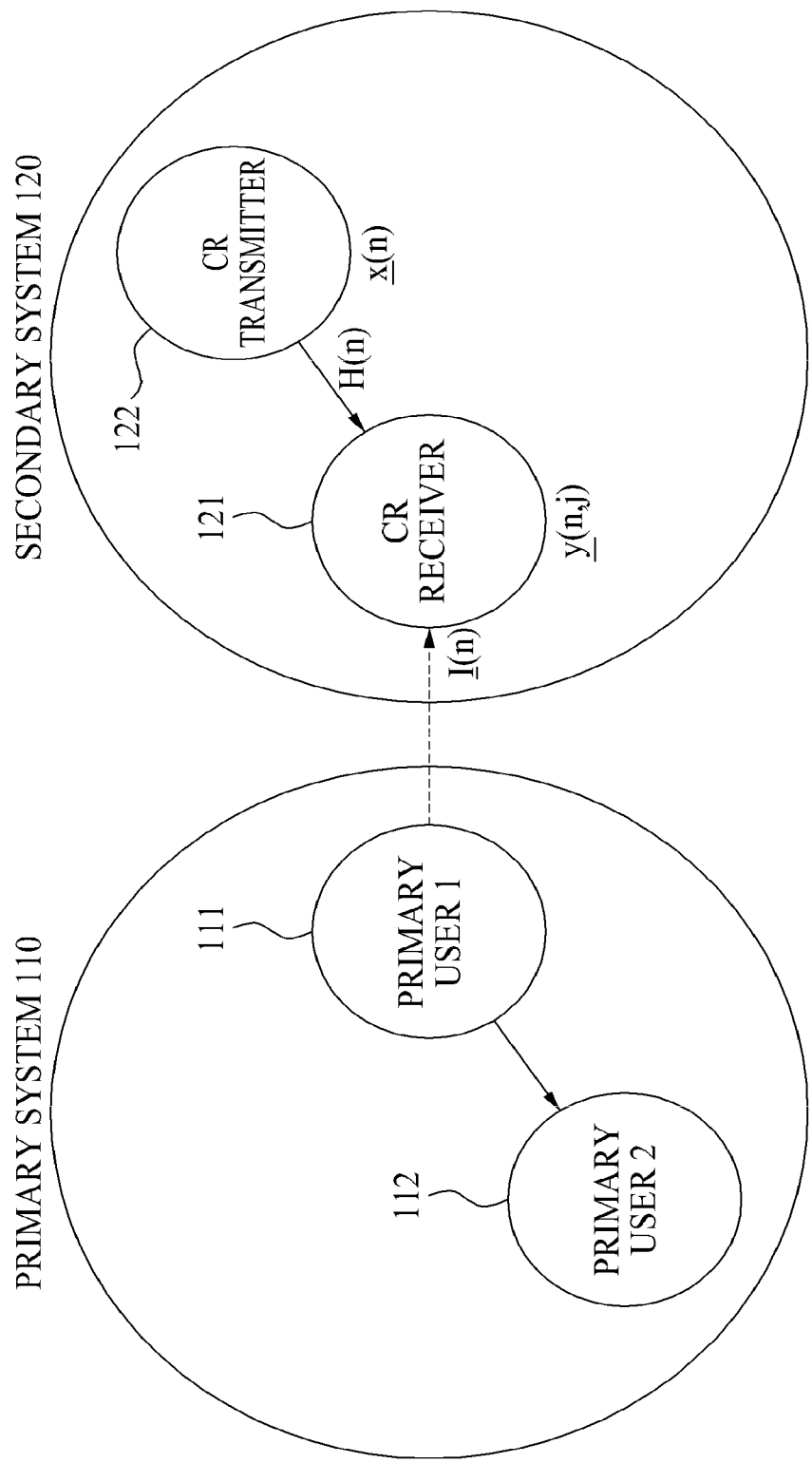
FIG. 1 is a diagram illustrating a primary system and a secondary system according to an exemplary embodiment.

FIG. 1 illustrates a primary system 110 and a secondary system 120 according to an exemplary embodiment.

Referring to FIG. 1, the primary system 110 includes a primary user (1) 111 and a primary user (2) 112. The secondary system 120 includes a cognitive radio (CR) receiver 121 and a CR transmitter 122.

The secondary system 120 may recognize a portion of or entire radio resources, assigned for the primary system 110, as an available radio resource using a CR technology. Also, the CR receiver 121 and the CR transmitter 122 of the secondary system 120 may receive/transmit data from/to each other using the recognized radio resources.

According to an aspect, the primary system 110 has higher priority than the secondary system 120 with respect to the radio resources assigned for the primary system 110. Accordingly, the primary system 110 may use the assigned radio resources regardless of a need by the secondary system 120 for use of radio resources.

Only when the CR receiver 121 or the CR transmitter 122 of the secondary system 120 do not affect the primary system 110, may the CR receiver 121 or the CR transmitter 122 use the assigned radio resources. Accordingly, the CR receiver 121 or the CR transmitter 122 may sense a signal of the primary system 110, and use the radio resources where the CR receiver 121 or the CR transmitter 122 does not sense the signal of the primary system 110. Conversely, where the CR receiver 121 or the CR transmitter 122 senses the signal of the primary system 110, the CR receiver 121 or the CR transmitter 122 may not use the radio resources assigned for the primary system 110.

Figure 2:
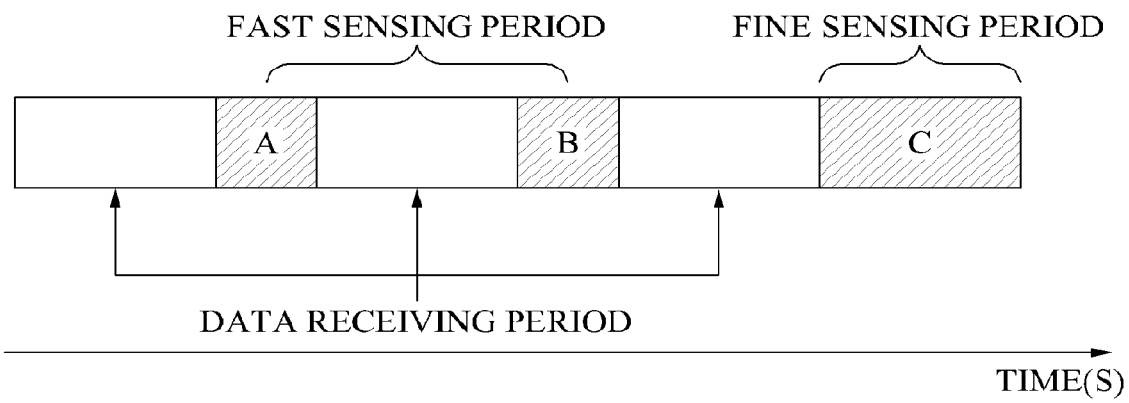
FIG. 2 is a diagram illustrating a fast sensing period and a fine sensing period of a secondary system according to an exemplary embodiment.

FIG. 2 illustrates a fast sensing period and a fine sensing period of a secondary system according to an exemplary embodiment.

Referring to FIG. 2, a CR receiver of the secondary system receives data transmitted from a CR transmitter during a data receiving period. Also, the CR receiver senses a signal of a primary system during fast sensing periods A and B and a fine sensing period C.

In general, a time length of each of the fast sensing periods A and B is shorter than that of the fine sensing period C, and the CR receiver performs a fast sensing with a relatively short time period. That is, the CR receiver receives the signal of the primary system during the fast sensing periods A and B and determines whether power of the received signal is greater than a predetermined standard sensing level in order to determine whether the signal of the primary system exists.

Where it is determined that the signal of the primary system exists in the fast sensing period B, the CR receiver performs a fine sensing to accurately determine whether the signal of the primary system exists during the fine sensing period C.

For example, the CR receiver determines more precisely whether the received signal is the signal of the primary system during the fine sensing period C using a matched filter, and the like.

Where the CR receiver performs the fast sensing and fine sensing, data may not be transmitted in the secondary system during the fast sensing periods A and B and the fine sensing period C, which may be waste of time resources. However, the secondary system may continuously transmit the data since the CR receiver according to an exemplary embodiment does not perform the fast sensing and fine sensing, which will be described below. Accordingly, a CR receiver according to an exemplary embodiment may more efficiently use radio resources.

In general, a false alarm probability and a missed detection probability are determined depending on a standard sensing level used where the CR receiver performs the fast sensing. For example, where the standard sensing level is set extremely high, the CR receiver may determine that the received signal does not exist although the signal of the primary system actually do exist. The missed detection probability refers to a rate that the CR receiver misses the signal of the primary system.

Conversely, where the standard sensing level is set extremely low, the CR receiver may erroneously determine that the received signal exists even though the signal of the primary system actually does not exist. In this case, the fine sensing is unnecessarily performed, and thus the radio resources may be wasted. The false alarm probability refers to a rate that the signal of the primary system is erroneously sensed.

Figure 3:
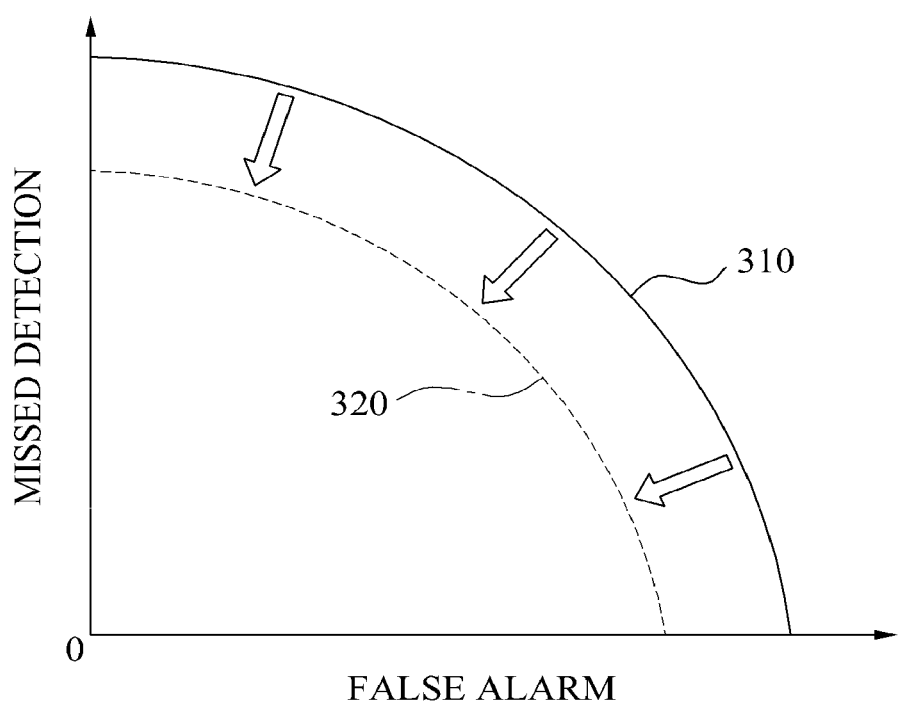
FIG. 3 is a curve graph illustrating a relationship between a false alarm probability and a missed detection probability of a secondary system according to an exemplary embodiment.

FIG. 3 illustrates a curve 310 showing a relationship between a false alarm probability and a missed detection probability of a secondary system according to an exemplary embodiment.

Referring to FIG. 3, the curve 310 indicates a false alarm probability and a missed detection probability where a CR receiver performs a fine sensing and a fast sensing. The false alarm probability and missed detection probability move according to the curve 310 depending on a standard sensing level. Referring to the curve 310, a relationship between the false alarm probability and missed detection probability is a tradeoff relationship.

Where the CR receiver performs the fast sensing and fine sensing, the false alarm probability and missed detection probability may not simultaneously decrease. That is, a curve 320 may not be obtained instead of the curve 310 by controlling the standard sensing level. However, a CR receiver according to an exemplary embodiment senses a signal of a primary system using a known signal or a correlation matrix. Accordingly, the curve 320 may be obtained instead of the curve 310, which will be described below.

Hereinafter, referring again to FIG. 1, an operation according to an exemplary embodiment is described. For illustration purpose only, it is assumed that the primary system 110 and the secondary system 120 use an orthogonal frequency division modulation (OFDM). Thus, it is understood that applicability is not limited to a communication system using an OFDM.

A radio channel H(n) is formed between the CR receiver 121 and the CR transmitter 122. In this instance, n indicates an index of a frequency band corresponding to a sub-carrier. The CR receiver 121 receives a signal $\underline{x}(n)$, transmitted from the CR transmitter 122, through the radio channel H(n). Also, the CR receiver 121 may receive an interference signal $\underline{I}(n)$ which is a signal of primary user (1) 111. Accordingly, signals $\underline{y}(n, j)$, received by the CR receiver 121 with respect to a $j^{th}$ OFDM symbol (or, in a $j^{th}$ time slot), may be represented as, $$\underline{y}(n,j) = H(n)\underline{x}(n) + \underline{I}(n) + \underline{w}(n) \quad \text{[Equation 1]}$$

where $\underline{w}(n)$ denotes a white Gaussian noise.

In this instance, where the signals $\underline{y}(n, j)$ are received through M antennas of Nr antennas installed in the CR receiver 121, the signals $\underline{y}(n, j)$ may be a vector having a size of M×1.

Also, signals $\underline{y}(n_p, j)$, received by the CR receiver 121 in a frequency band corresponding to an $n_p^{th}$ sub-carrier with respect to the $j^{th}$ OFDM symbol, may be represented as, $$\underline{y}(n_p,j) = H(n_p)\underline{x}(n_p) + \underline{I}(n_p) + \underline{w}(n_p) \quad \text{[Equation 2]}$$

where $n_p$ denotes an index of a frequency band corresponding to a sub-carrier where a signal previously known to the CR receiver 121 is assigned. The known signal may be a pilot signal.

In this instance, the CR receiver 121 may estimate $H(n_p)$, and be already aware of $\underline{x}(n_p)$. Accordingly, the CR receiver 121 may obtain a signal $\underline{z}(n_p, j)$ where an element $H(n_p)\underline{x}(n_p)$ associated with the known signal is subtracted from $\underline{y}(n_p, j)$. The signal $\underline{z}(n_p, j)$ may be given by, $$\underline{z}(n_p, j) = \underline{y}(n_p, j) - H(n_p)\underline{x}(n_p) \quad \text{[Equation 3]}$$
$$= \underline{I}(n_p) + \underline{w}(n_p)$$

Also, the CR receiver 121 may calculate a correlation matrix $K(n_p, j)$ associated with a signal $\underline{I}(n_p)$ of the primary user (1) 111 using $\underline{z}(n_p, j)$. The correlation matrix $K(n_p, j)$ may be calculated by, $$K(n_p,j) = \underline{z}(n_p,j)\underline{z}^H(n_p,j) \quad \text{[Equation 4]}$$

Where the signal $\underline{I}(n_p)$ of the primary user (1) 111 does not exist, $\underline{z}(n_p, j) \approx \underline{w}(n_p)$. Accordingly, the correlation matrix $K(n_p, j)$ generally has a diagonal matrix form. Where the signal $\underline{I}(n_p)$ of the primary user (1) 111 exists, the correlation matrix $K(n_p, j)$ does not have the diagonal matrix form.

Accordingly, the CR receiver 121 may determine whether the signal $\underline{I}(n_p)$ of the primary user (1) 111 exists based on the correlation matrix $K(n_p, j)$. A size of the correlation matrix $K(n_p, j)$ may be determined based on M. According to an exemplary embodiment, the CR receiver 121 may control the size of the correlation matrix $K(n_p, j)$ by controlling M. Thus, the computation amount required when calculating the correlation matrix $K(n_p, j)$ or operations using the correlation matrix $K(n_p, j)$ may be controlled.

Also, the CR receiver 121 may calculate correlation matrices $K(n_p, j)$ corresponding to each of a plurality of pilots with respect to the $j^{th}$ OFDM symbol. The CR receiver 121 may calculate a sum of the calculated correlation matrices $K(n_p, j)$ corresponding to each of the plurality of pilots. The sum R(j) may be calculated as, $$R(j) = \frac{1}{N_p}\sum_{n_p=1}^{N_p} K(n_p, j) \quad \text{[Equation 5]}$$

where $N_p$ denotes a number of pilots, and is adjustable.

Also, the CR receiver 121 may determine whether the signal $\underline{I}(n_p)$ of the primary user (1) 111 exists using the sum R(j). Where the signal $\underline{I}(n_p)$ of the primary user (1) 111 does not exist, the sum R(j) may be represented as, $$R(j) = \frac{1}{N_p}\sum_{n_p=1}^{N_p} \underline{w}(n_p)\underline{w}^H(n_p) \cong \sigma_n^2 I \qquad \text{[Equation 6]}$$

where $\sigma_n^2$ is associated with an additive white Gaussian noise, and I is an identity matrix.

Referring to the Equation 6, where the signal $\underline{I}(n_p)$ of the primary user (1) 111 does not exist, it is ascertained that R(j) has a diagonal matrix form.

Conversely, where the signal $\underline{I}(n_p)$ of the primary user (1) 111 exists, R(j) may be represented as, $$R(j) = \frac{1}{N_p}\sum_{n_p=1}^{N_p}(\underline{I}(n_p)+\underline{w}(n_p))(\underline{I}(n_p)+\underline{w}(n_p))^H \qquad \text{[Equation 7]}$$

$$\cong \frac{1}{N_p}\sum_{n_p=1}^{N_p} \underline{I}(n_p)\underline{I}^H(n_p) + \sigma_n^2 I$$

Referring to the Equation 7, where the signal $\underline{I}(n_p)$ of the primary user (1) 111 exists, it is ascertained that R(j) does not have the diagonal matrix form. Accordingly, the CR receiver 121 may determine whether the signal $\underline{I}(n_p)$ of the primary user (1) 111 exists based on a form of R(j).

More specifically, the CR receiver 121 may determine whether the signal $\underline{I}(n_p)$ of the primary user (1) 111 exists based on off-diagonal elements of a correlation matrix $K(n_p, j)$ or R(j). In particular, the CR receiver 121 may determine whether the signal $\underline{I}(n_p)$ of the primary user (1) 111 exists using a metric of Equation 8 below.

$$m(j) = \Sigma\Sigma|R(j)|^2 - \text{Trace}(|R(j)|^2). \qquad \text{[Equation 8]}$$

For example, the CR receiver 121 compares a predetermined threshold value with m(j), calculated in the Equation 8, and thereby may determine whether the signal $\underline{I}(n_p)$ of the primary user (1) 111 exists based on a result of the comparing. Where the calculated m(j) is greater than the predetermined threshold value, it may be determined that the signal $\underline{I}(n_p)$ of the primary user (1) 111 exists. Where the calculated m(j) is equal to or less than the predetermined threshold value, it may be determined that the signal $\underline{I}(n_p)$ of the primary user (1) 111 does not exist.

The metric of the Equation 8 and also a condition number of R(j) may be used as a metric for determining whether the signal $\underline{I}(n_p)$ of the primary user (1) 111 exists.

Also, the CR receiver 121 may determine whether the signal $\underline{I}(n_p)$ of the primary user (1) 111 exists based on R(j) and m(j) of each of a plurality of OFDM symbols. That is, the CR receiver 121 calculates a correlation matrix in each of a plurality of time periods, and thereby may determine whether the signal $\underline{I}(n_p)$ of the primary user (1) 111 exists based on the calculated correlation matrix. The plurality of time periods may correspond to the plurality of OFDM symbols. For example, the CR receiver 121 may use m as a metric, and m may be represented as, $$m = \frac{1}{N_s}\sum_{j=1}^{N_s} m(j) \qquad \text{[Equation 9]}$$

where Ns denotes a number of OFDM symbols or time periods, and is adjustable to control computation complexity.

Figure 4:
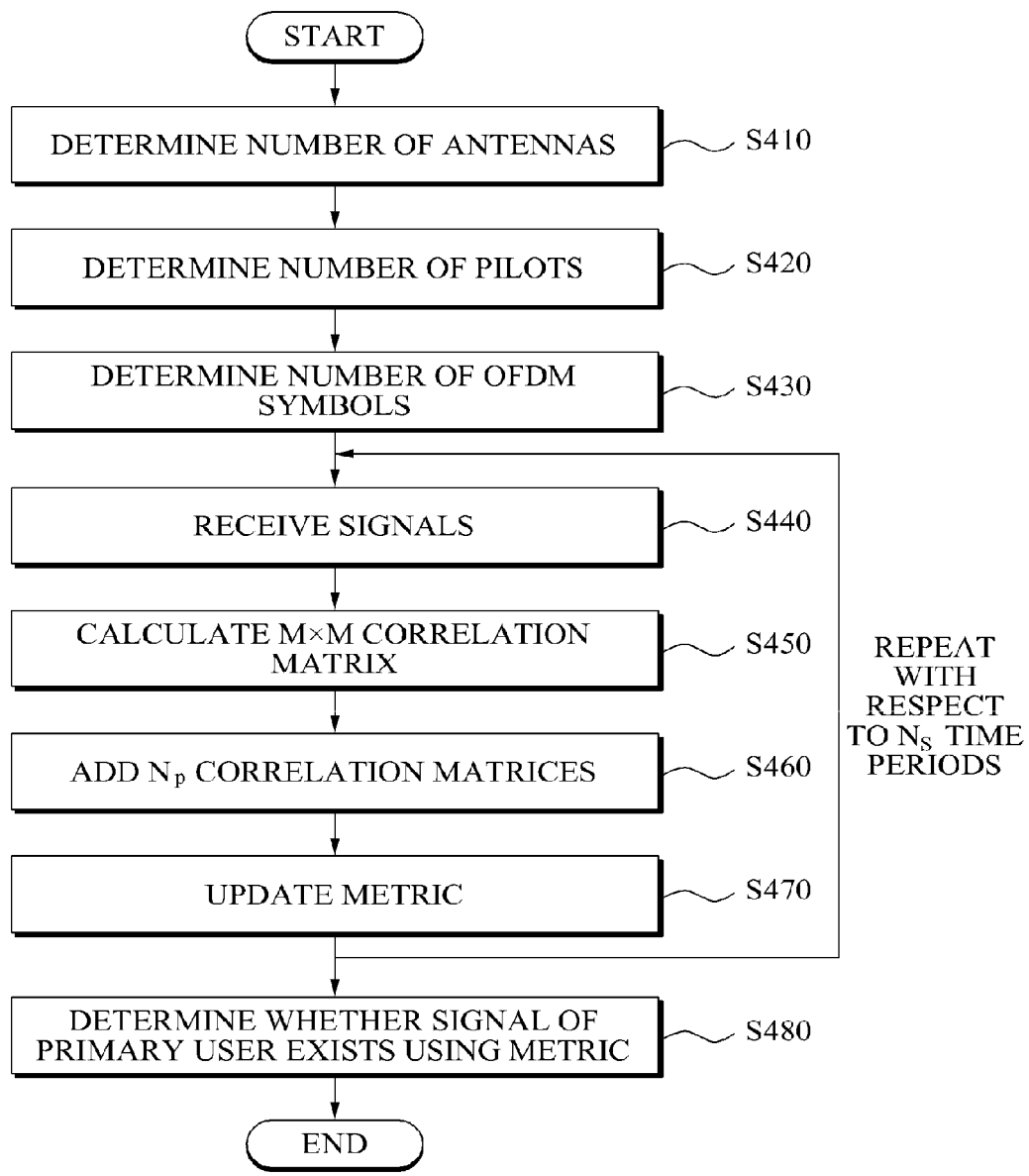
FIG. 4 is a flowchart illustrating a cognitive radio (CR) communication method according to an exemplary embodiment.

FIG. 4 is a flowchart illustrating a CR communication method according to an exemplary embodiment.

Referring to FIG. 4, in operation S410, a CR communication apparatus according to an exemplary embodiment determines a number of antennas, M, used to recognize a signal (interference) of a primary system from among antennas.

In operation S420, the CR communication apparatus determines a number of known signals (pilots), Np, used to recognize the signal of the primary system.

In operation S430, the CR communication apparatus determines a number of time periods or OFDM symbols, Ns, to recognize the signal of the primary system.

In operation S440, the CR communication apparatus receives signals from a primary user and a secondary transmitter of a secondary system through the M antennas. In this case, the received signals may include elements associated with at least Np known signals.

In operation S450, the CR communication apparatus calculates remaining elements based on a difference between the received signals and the elements associated with the at least Np known signals, and calculates Np M×M correlation matrices using the calculated remaining elements.

In operation S460, the CR communication apparatus adds up the Np M×M correlation matrices, and thereby may obtain a sum of the correlation matrices R(j).

In operation S470, the CR communication apparatus updates a metric used to recognize the signal of the primary user based on the obtained R(j).

The CR communication apparatus repeats operations from the receiving in operation S440 to the updating in operation S470, Ns number of times.

In operation S480, the CR communication apparatus determines whether the signal of the primary user exists using the generated metric.

Figure 5:
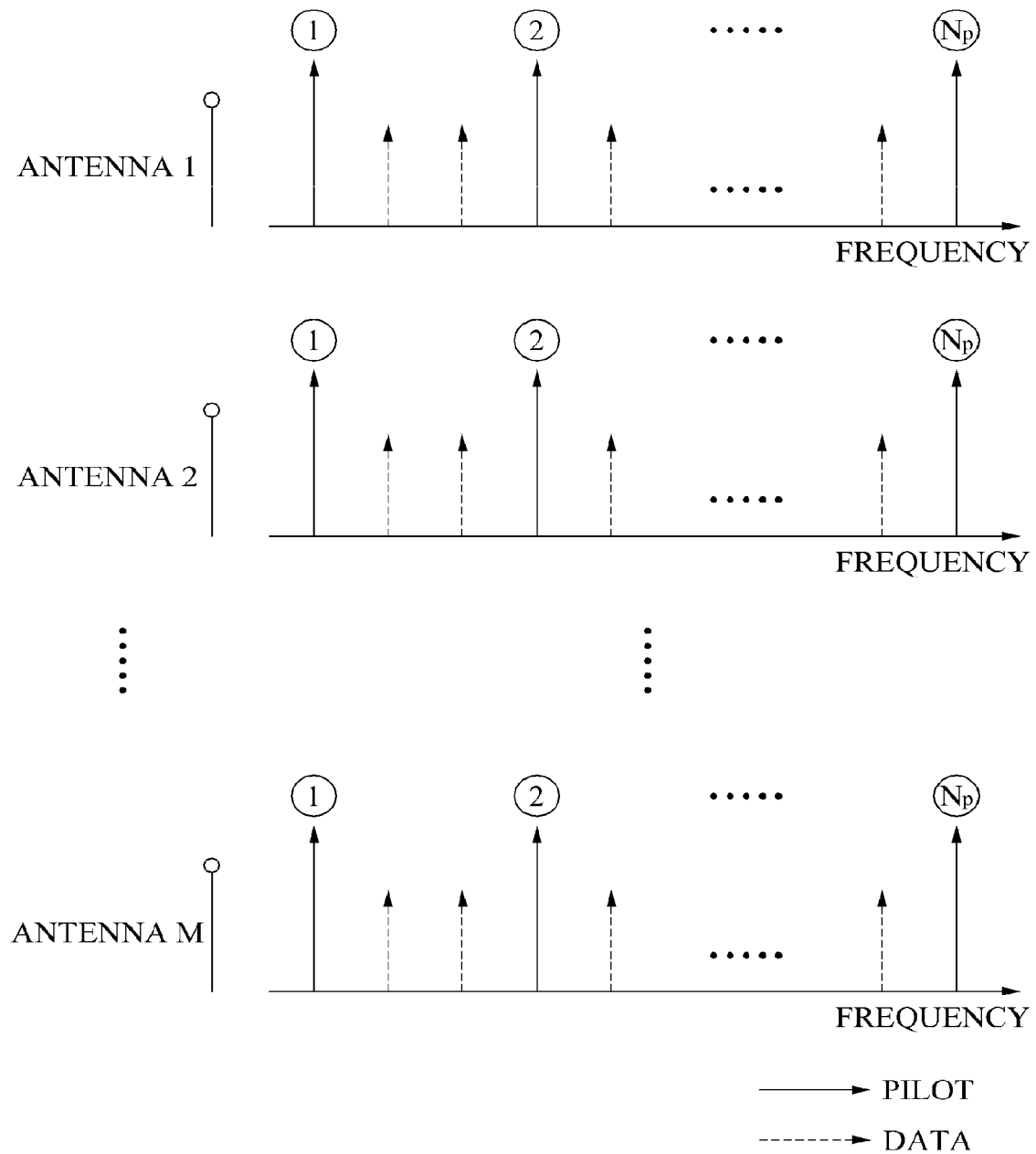
FIG. 5 is a diagram illustrating signals received through M antennas according to an exemplary embodiment.

FIG. 5 is a diagram illustrating signals received through M antennas according to an exemplary embodiment.

Referring to FIG. 5, each of the M antennas receives data and Np pilots in a plurality of frequency bands. Each of the plurality of frequency bands corresponds to each sub-carrier. Also, it is assumed that data and Np pilots illustrated in FIG. 5 are associated with a $j^{th}$ OFDM symbol.

For example, signals $\underline{y}(2, j)$, received through the M antennas in a frequency band of second pilot, may be represented as, $$\underline{y}(2,j) = H(2)\underline{x}(2) + \underline{I}(2) + \underline{w}(2) \qquad \text{[Equation 10]}$$

Also, a remaining element $\underline{z}(2, j)$ in the frequency band of the second pilot may be represented as, $$z(2, j) = \underline{y}(2, j) - H(2)\underline{x}(2) \qquad \text{[Equation 11]}$$

$$= \underline{I}(2) + \underline{w}(2).$$

Also, a correlation matrix K(2, j) may be calculated as, $$K(2,j) = \underline{z}(2,j)\underline{z}^H(2,j) \qquad \text{[Equation 12]}$$

In this instance, a CR communication apparatus according to an exemplary embodiment may determine whether a signal of a primary user exists based on whether the correlation matrix K(2, j) is a diagonal matrix.

Also, the CR communication apparatus may calculate a correlation matrix $K(n_p, j)$ in a plurality of frequency bands using the Np pilots to sense the signal of the primary user more precisely. Also, the CR communication apparatus may obtain a sum of the calculated Np correlation matrices $K(n_p,$ j), and precisely sense the signal of the primary user using the obtained sum R(j). As described above, the CR communication apparatus may sense the signal of the primary user using an m(j) or m generated based on the sum R(j).

Figure 6:
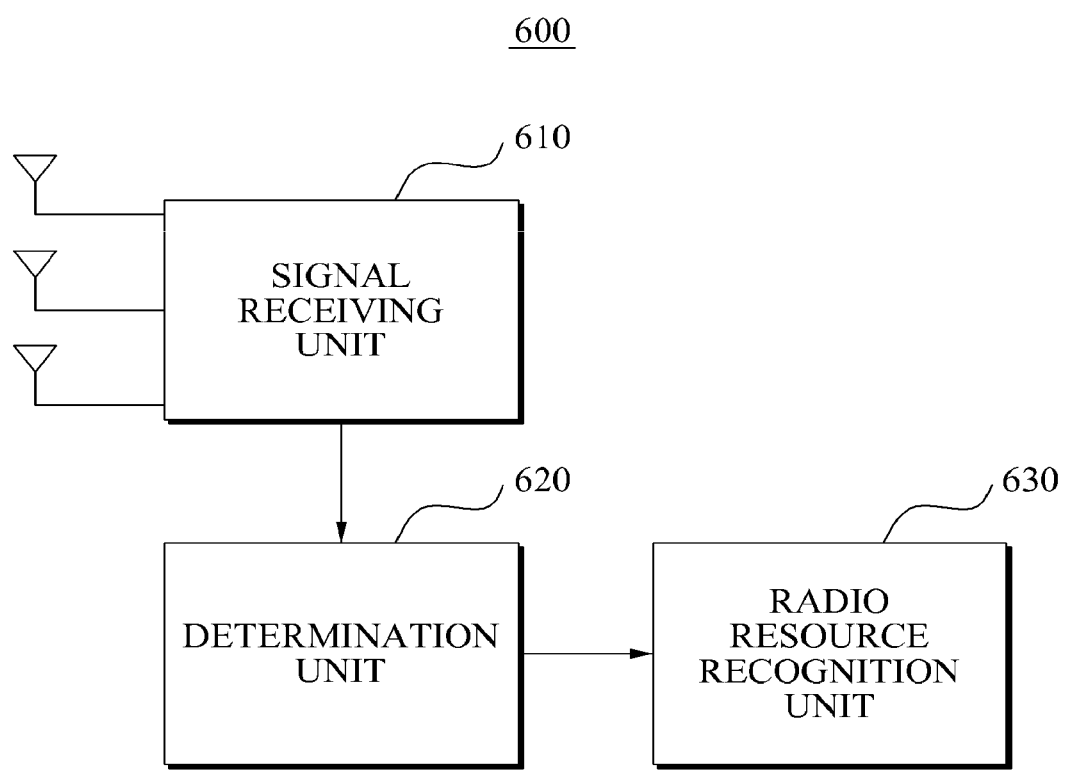
FIG. 6 is a block diagram illustrating a CR communication apparatus according to an exemplary embodiment.

FIG. 6 illustrates a CR communication 600 apparatus according to an exemplary embodiment.

Referring to FIG. 6, the CR communication apparatus 600 comprises a signal receiving unit 610, determination unit 620, and radio resource recognition unit 630.

The signal receiving unit 610 receives signals from a primary user of a primary system and a secondary transmitter of a secondary system. In this case, the received signals include an element associated with at least one known signal of the secondary transmitter.

The determination unit 620 determines whether a signal of the primary user exists from among the received signals based on the element associated with the at least one known signal. Here, the determination unit 620 calculates a remaining element based on a difference between the received signals and the element associated with the at least one known signal, and generates a correlation matrix.

Also, the determination unit 620 determines whether the signal of the primary user exists based on whether a form of the generated correlation matrix is similar to a form of a diagonal matrix.

Also, the determination unit 620 may use various metrics generated based on a correlation matrix to sense whether the signal of the primary user exists. In this case, the metrics may include R(j), m(j), and m described above. Also, a size of the correlation matrix may be controlled depending on a number of antennas used to sense the signal of the primary user from among entire antennas in order to control the computation complexity.

The radio resource recognition unit 630 recognizes an available radio resource using a CR technology depending on whether the signal of the primary user exists.

The radio resource recognition unit 630 may recognize that a radio resource assigned for the primary system is unavailable where the signal of the primary user exists, and recognize that the radio resource assigned for the primary system is available where the signal of the primary user does not exist.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio (CR) communication apparatus comprising:
    a signal receiving unit configured to receive signals from a primary user of a primary system and a secondary transmitter of a secondary system, the received signals comprising respective elements associated with respective previously known signals of the secondary transmitter, and the previously known signals being previously known to the CR communication apparatus; and
    a determination unit configured to
        determine correlation matrices based on the respective received signals and the respective elements, wherein a number of the correlation matrices is a number of the previously known signals, and each of dimensions of the correlation matrices is a number of antennas that receive the signals,
        determine a sum of the correlation matrices,
        determine a numeric metric based on the sum of the correlation matrices, and
        determine whether a signal of the primary user exists from among the received signals based on the numeric metric.

2. The CR communication apparatus of claim 1, wherein the determination unit is further configured to:
    determine remaining elements of the respective received signals based on differences between the respective received signals and the respective elements associated with the respective previously known signals; and
    determine the correlation matrices based on the respective remaining elements.

3. The CR communication apparatus of claim 1, wherein the determination unit is further configured to:
    determine whether the signal of the primary user exists based on whether one of the correlation matrices comprises an off-diagonal element.

4. The CR communication apparatus of claim 1, wherein the determination unit is further configured to:
    determine whether the signal of the primary user exists based on whether one of the correlation matrices is not a diagonal matrix.

5. The CR communication apparatus of claim 1, wherein the previously known signals are assigned to respective sub-carriers.

6. The CR communication apparatus of claim 1, wherein a number of the correlation matrices is adjustable.

7. The CR communication apparatus of claim 1, wherein the determination unit is further configured to:
    determine a correlation matrix in each of time periods; and
    determine whether the signal of the primary user exists based on the correlation matrix in each of the time periods.

8. The CR communication apparatus of claim 1, further comprising:
    a radio resource recognition unit configured to recognize an available radio resource using a CR technology based on whether the signal of the primary user exists.

9. The CR communication apparatus of claim 8, wherein the radio resource recognition unit is further configured to:
    recognize that a radio resource assigned to the primary system is unavailable if the signal of the primary user exists; and
    recognize that the radio resource assigned to the primary system is available if the signal of the primary user does not exist.

10. The CR communication apparatus of claim 1, wherein the signal receiving unit is further configured to:
   adjust sizes of the respective correlation matrices to adjust a computation amount of the determination unit.

11. The CR communication apparatus of claim 1, wherein the determination unit is further configured to:
   determine that the signal of the primary user exists if the numeric metric is greater than a predetermined value; and
   determine that the signal of the primary user does not exist if the numeric metric is less than the predetermined value.

12. The CR communication apparatus of claim 1, wherein the determination unit is configured to determine the numeric metric based on a trace of an absolute value of the sum of the correlation matrices that is squared.

* * * * *